US008032570B2

(12) United States Patent  
Kurichiyath et al.

(10) Patent No.: US 8,032,570 B2
(45) Date of Patent: Oct. 4, 2011

(54) EFFICIENT STACKED FILE SYSTEM AND METHOD

(75) Inventors: Sudheer Kurichiyath, Bangalore Karnataka (IN); Arun Keshava Murthy, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 504 days.

(21) Appl. No.: 12/175,292

(22) Filed: Jul. 17, 2008

(65) Prior Publication Data

US 2009/0030935 A1 Jan. 29, 2009

(30) Foreign Application Priority Data

Jul. 26, 2007 (IN) .............................. 1616/CHE/2007

(51) Int. Cl.
 *G06F 12/00* (2006.01)
 *G06F 17/30* (2006.01)
(52) U.S. Cl. ........................................ 707/823; 707/829
(58) Field of Classification Search .................. None
 See application file for complete search history.

(56) References Cited

U.S. PATENT DOCUMENTS

| 5,561,799 | A | * | 10/1996 | Khalidi et al. ................ 707/809 |
| 5,870,734 | A | * | 2/1999 | Kao ..................................... 1/1 |
| 5,903,754 | A | * | 5/1999 | Pearson ........................ 719/310 |
| 5,991,753 | A | * | 11/1999 | Wilde .................................... 1/1 |
| 2004/0015522 | A1 | * | 1/2004 | Hensbergen ................. 707/204 |
| 2005/0198238 | A1 | * | 9/2005 | Sim et al. ...................... 709/222 |
| 2005/0273858 | A1 | * | 12/2005 | Zadok et al. .................... 726/24 |
| 2006/0117298 | A1 | | 6/2006 | Delapedraja et al. |

OTHER PUBLICATIONS

Stackable design of file systems, Heidemann, UCLA, 1995.*
A stackable vnode level encryption file system, Zadok et al, Columbia University, 1998.*
Erez Zadok, "FIST: A System for Stackable File System Code Generation", Columbia University, Dec. 2000, p. 20, Section 2.1.4.5.

* cited by examiner

*Primary Examiner* — Pierre M Vital
*Assistant Examiner* — Augustine Obisesan

(57) ABSTRACT

A stacked file system and method for managing a stack are disclosed. In one embodiment, a stacked file system includes a stack and a stack manager. The stack has at least a file system stacked on top of an underlying file system. Further, the stack manager has a logic for managing the stack, where the logic includes an eject operation for ejecting a first file system from the stack.

11 Claims, 3 Drawing Sheets

EFFICIENT STACKED FILE SYSTEM AND METHOD

RELATED APPLICATIONS

This patent application claims priority to Indian patent application serial number 1616/CHE/2007, having title "An Efficient Stacked File System and Method", filed on 26 Jul. 2007 in India (IN), commonly assigned herewith, and hereby incorporated by reference.

BACKGROUND

A file system in a computing environment is a collection of files and directories. A file system permits operations such read, write, listing attributes, etc. on the files and directories via a set of well defined interfaces. For example, a file system knows how to arrange a collection of files on a hard disk or a memory and applies file operations such as reading a file, listing the name of the files in a directory, and so on. One way of extending file system operations is using a stacked file system. The stacked file system provides mechanisms for enriching system functionality by using an extensible file system interface that allows new features to be added incrementally. A prior art published patent application by Hewlett-Packard Company entitled "Stacked File Systems and Methods", publication number 20060117298 dated Jun. 1, 2006, describes such a stacked file system and method.

An example of a stacked file system includes virus scanning module, encrypting module and logging file access module. These modules are stacked one on top of another to form a layered or stacked file system. However, every module in the stacked file system adversely affects the file system performance. It is known that there may be as much as 5% performance impact for every module exists in the stacked file system. For example, a file system in use by a file server needs to enable virus scanning only if intrusion detection system (IDS) finds a malicious network packet being processed instead of running the virus scan each time the file is accessed. Likewise, accesses by trusted or secure users or clients within or outside a LAN may not require any further protection inside the file system.

BRIEF DESCRIPTION OF DRAWINGS

The invention is now described in detail with reference to the following drawings in which.

DETAILED DESCRIPTION

In the following detailed description of various embodiments of the present invention, reference is made to the accompanying drawings, which are shown by way of illustration in which the invention may be practiced. Therefore, the following detailed description is not to be taken in a limiting sense and the scope of the present invention is defined only by the appended claims.

A stacked file system and method capable of ejecting and inserting stackable file systems in a stacked file system are disclosed herein. As used herein, file system, module and layer are used interchangeably and each refer to a stackable file system in a stack. Generally, a stacked file system resides within an operating system and it includes a stack manager for managing the stacked file system within a computing environment.

Figure 1:
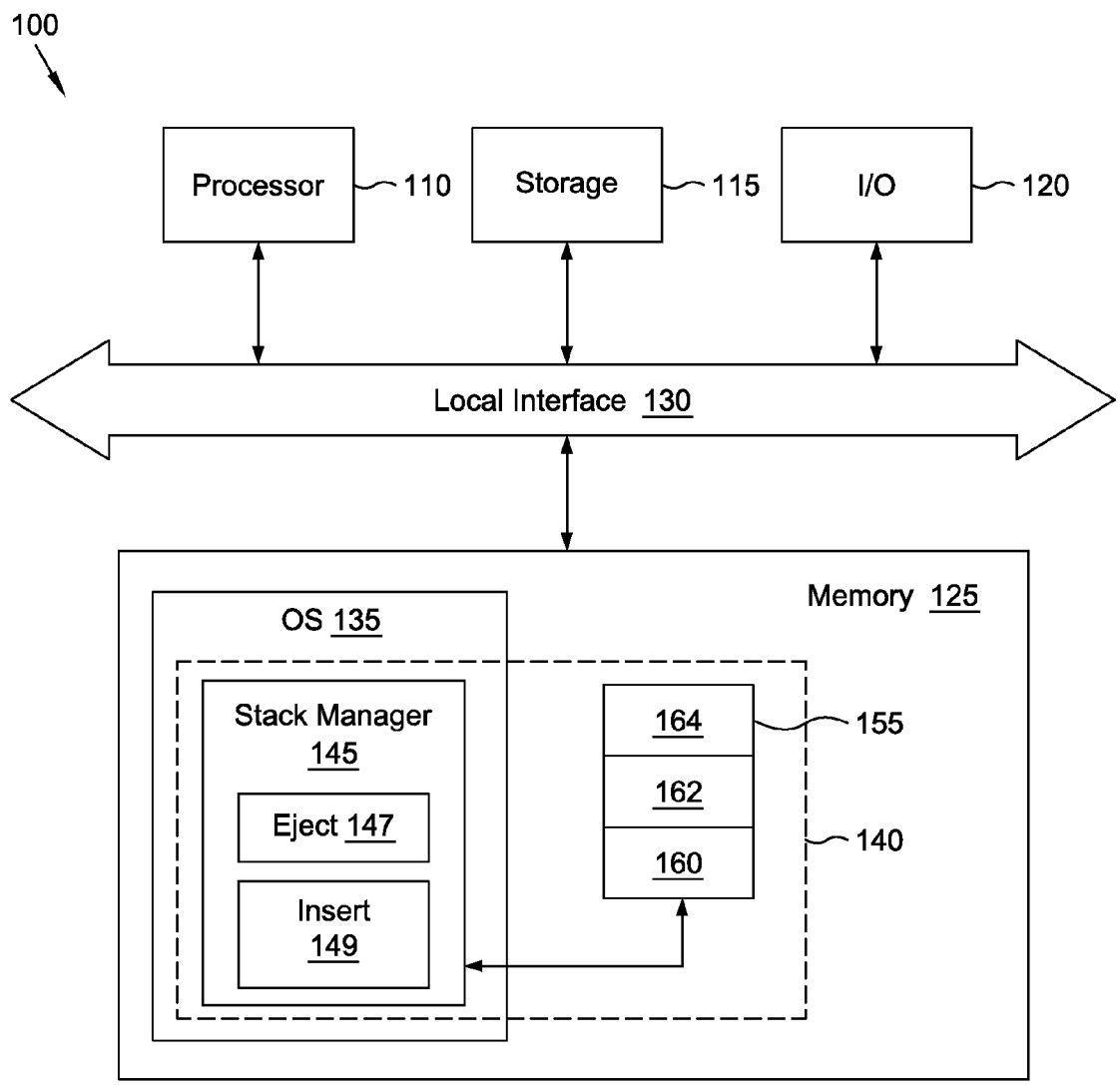
FIG. 1 shows a block diagram of a stacked file system residing in a computer environment according to an embodiment of the present invention.

FIG. 1 shows a block diagram of a computing environment 100 in which a stacked file system 140 according to an embodiment may be implemented. The computing environment 100 typically includes a processor 110, a storage device 115, one or more input/output ports 120 and a memory 125 that are communicatively coupled to each other via a local interface 130. The processor 110 is a hardware device for executing software programs that are generally stored in the memory 125 or are accessible from the storage device 115. The storage device 115 can be a non-volatile memory element such as a hard disk, CDROM, magnetic or optical storage media or a combination thereof. The memory 125 can be one or a combination of volatile and non-volatile memory elements such as random access memory (RAM) devices and read only memory (ROM) devices.

As shown in the example of FIG. 1, the memory 125 includes an operating system 135, which is operated by the processor 110. The operating system 135 controls the executions of computer programs, provides scheduling, input-output control and manages data, file and memory, communication and related services needed within the computing environment 100. The operating system 135 also hosts a stack manager 145, which is an executable program, script, or any other entity comprising a set of instructions to be performed. The stack manager 145 performs functions such as creating, validating and mounting layers in a stack 155. A stack as used herein generally refers to layers (layers 160-164 as shown in FIG. 1) stacked on top of one another. Each layer or file system is an aggregation of vnodes and other operations, which are known as virtual file system (vfs) operations. The term vnode as used herein refers to a data structure, which stores basic information about a regular file, directory, or other file system objects. In an embodiment, the layer 160 acts as an underlying file system for the stack 155 and it manages all the file systems (i.e. layers) within the stack 155. All accesses and operations to the layers in the stack 155 are carried out through the underlying file system (layer 160). The stack manger 145 and the stack 155 collectively form the staked file system 140 with each layer in the stack 155 can be stacked on top, inserted or ejected therefrom as described hereinafter.

The functions of creating, validating and mounting the layers in the stack 155 are well known in the art and will not be described further. However, in addition to these known functions, further functions, namely, layer ejection 147 and layer insertion 149, in accordance with embodiments of the present invention are incorporated in the stack manager 145 to provide an efficient stacked file system. The layer ejection 147 and insertion 149 functions are used in a scenario where there is a need to dynamically tune and configure the underlying file system based on the needs of the application by making one or more layers in the stack 155 invisible during a normal look up operation, thus, resulting in file system performance improvement. For example, a stackable tracing file system (i.e. the data structure of the tracing file system) can be inserted into the file system stack for performing specific tracing operations and once completed the inserted stackable tracing file system can be ejected. The specific tracing operations can include capturing information according to users, groups, processes, file names and file operations, and logging and storing the captured information in the storage device 115. Similarly, stackable file systems for system auditing, security containment and debugging can also be inserted into the stack to perform the necessary functions and thereafter ejected from the stack.

The details of layer ejection 147 and insertion 149 functions are herein explained in the following two scenarios with reference to FIGS. 2 and 3.

Scenario 1: Ejecting a Layer.

Ejecting a layer from a stack is different from a normal unmount operation. In the normal unmount operation, the file system data structure in the virtual file system (VFS) mounted list is removed and all modified in-core data and meta-data pointed to by inodes are flushed to the storage device 115 and the corresponding vnodes are subsequently removed from memory 125. Whereas, ejecting the layer from a stack implies that the information relating to the layer being ejected is removed from the VFS mounted list and all the information about the vnodes is intact. In an embodiment, all vnodes handled by the ejected layer are handed over to the underlying file system in the stack. That is, the file system residing below the ejected layer. Thus, any calls to the vnodes go directly to the underlying file system, thereby making the ejected layer invisible.

Figure 2:
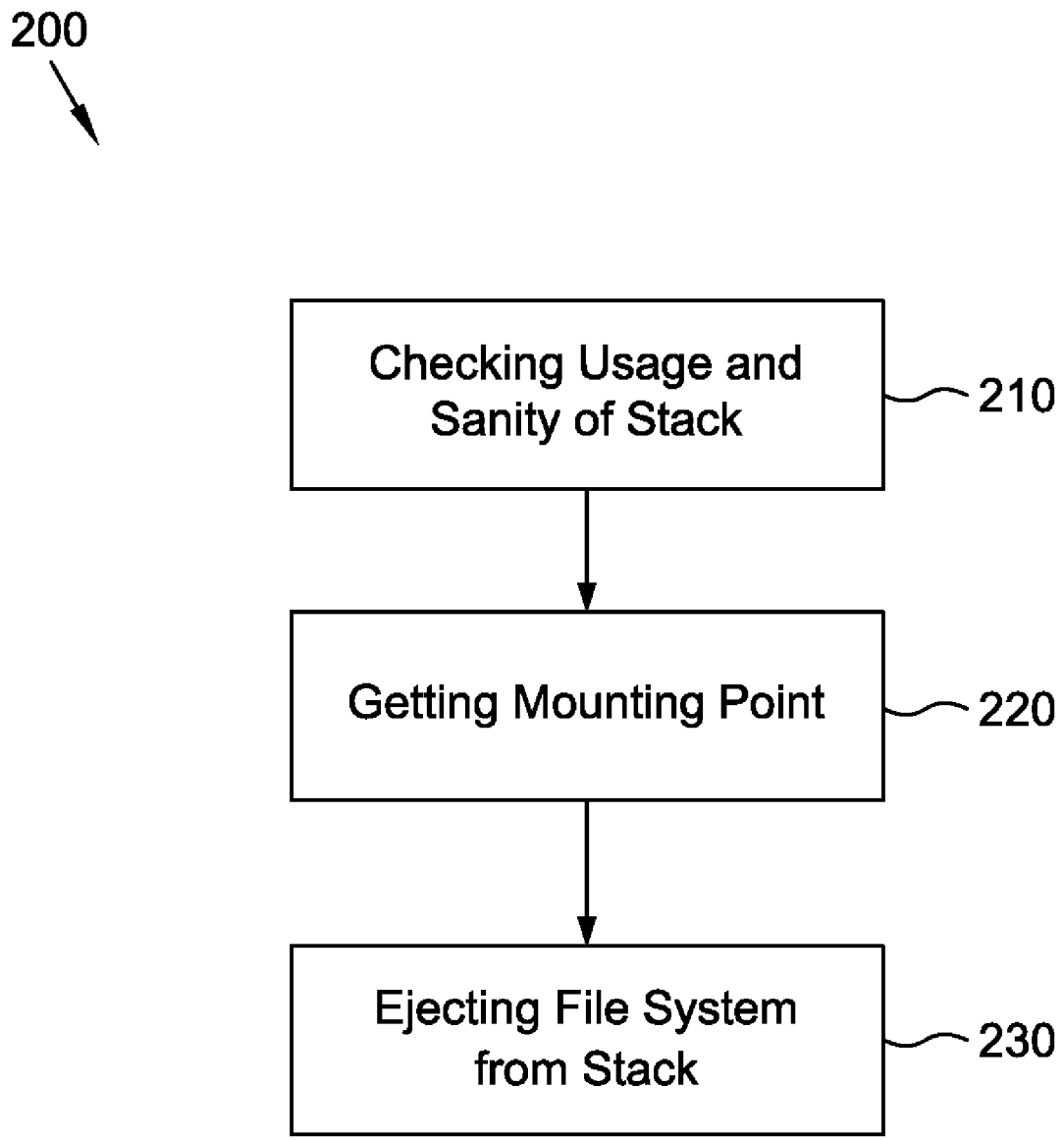
FIG. 2 shows a flowchart depicting a file system eject operation according to an embodiment of the present invention.
Figure 3:
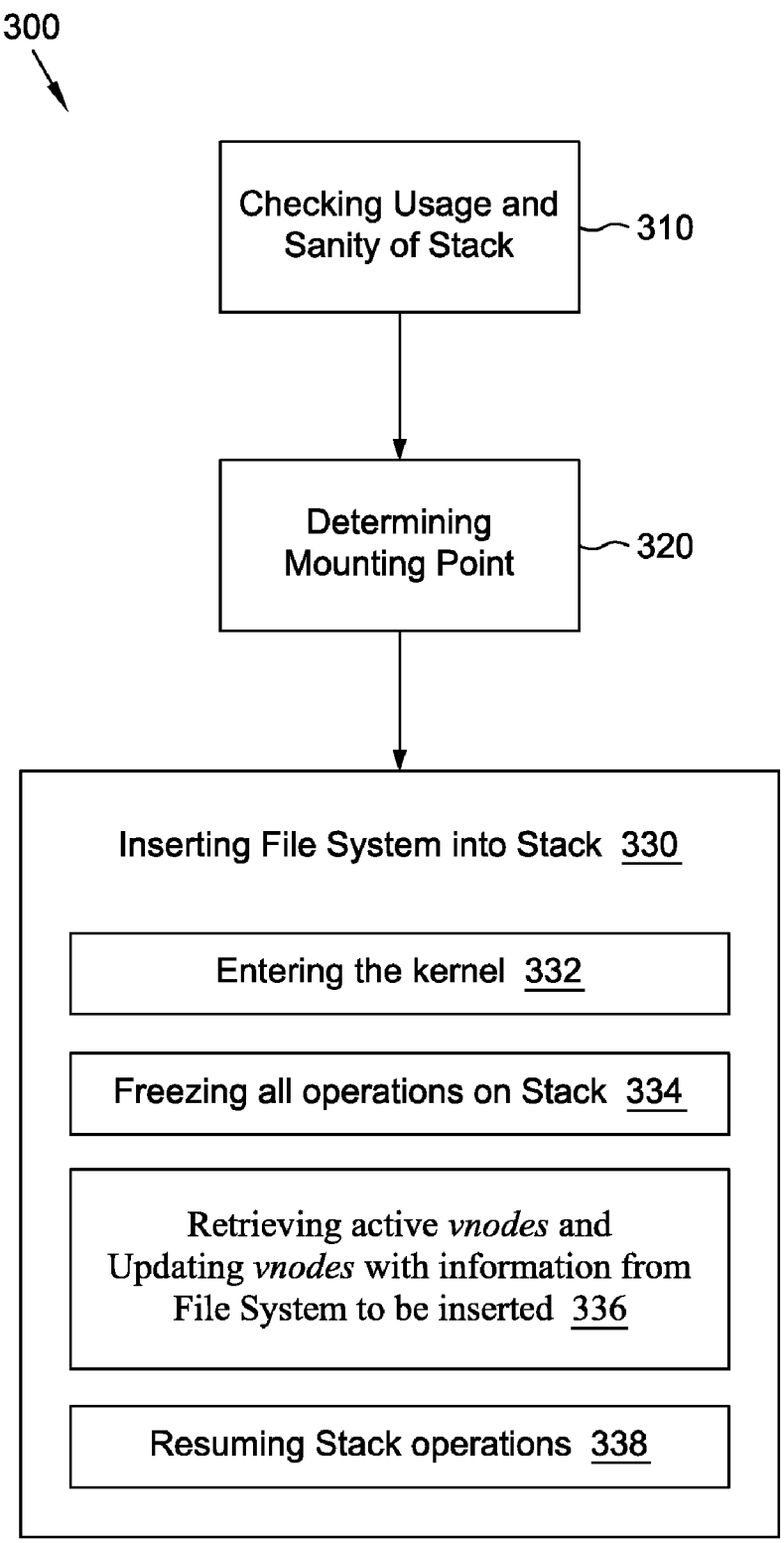
FIG. 3 shows a flowchart depicting a file system insert operation according to an embodiment of the present invention.

FIG. 2 shows a flowchart depicting a file system eject operation 200 in accordance with an embodiment. The eject operation 200 includes step 210 which checks the usage and sanity of the stack (e.g. stack 155) and enters the kernel of the operating system using a fcntl( ) call, where the fcntl( ) call provides control over files being accessed. Mounting point, fd, of the layer to be ejected is obtained in step 220 by performing an open operation, open( ). For example:

fd=open ("/ejectfs_mount_point", . . . );

The open operation scans the VFS mounted list maintained in the operating system kernel for "/ejectfs_mount_point", which is the file system to be ejected and returns the mounting point.

Once the mounting point, fd, is obtained, the eject operation is performed in step 230 by calling fcntl( ) using the mounting point, fd, to enter the kernel. Thus, the fcntl( ) function needs to be modified to include a new arguments. For example:

error=fcntl (fd, F_EJECT, "VEJECTFS");

where F_EJECT is an argument containing attributes associated with the layer to be ejected and VEJECTFS identifies the layer to be ejected from the stack. The name VEJECTFS is an example and it indicates that the file system with such a name is an ejectable file system. This is similar to other file system names such as NFS, VXFS, and the like.

Ejecting the file system in step 230 involves flushing all vnodes and transferring the ownership of all vnodes of the ejecting layer to the underlying file system. The file system eject operation is completed with the removal of the ejected file system data structure from the VFS mounted list. For example, a file system may be ejected from the stack by using existing unmount command:

unmount—o VEJECTFS where VEJECTFS being the top layer of the stack to be ejected. In a more general form, VEJECTFS located at an $N^{th}$ layer may be ejected by using the command:

unmount—o VEJECTFS, [EJECTLAYER=N]

In the above example, the unmount command makes use of the open( ) and fcntl( ) to implement the logic of ejecting layers described.

Scenario 2: Inserting a Layer.

A new layer or an ejected layer can be inserted into the stack when the operations thereof are needed. FIG. 3 shows a flowchart depicting a file system insert operation 300 in accordance with an embodiment. The insert operation 300 includes step 310 which checks the usage and sanity of the stack (e.g. stack 155) and enters the kernel of the operating system using a fcntl( ) call, where the fcntl( ) call provides control over files being accessed. Mounting point, fd, of the layer to be inserted is determined in step 320 by performing an open operation, open( ). For example:

fd=open ("/insertfs_mount_point", . . . );

It should be noted that the open( ) command is used by the mount command. The mounting point, fd, returned from the above open( ) is the top of the stack mounting point. If the layer to be inserted is somewhere within the stack other than the top, an [INSERTLAYER=N] argument in the mount command is used to indicate the file system upon which the layer is to be inserted, as further described hereinafter.

Once the mounting point, fd, is determined, the insert operation is performed in step 330 by first calling fcntl( ) using the mounting point, fd, to enter the kernel (step 332). Thus, the fcntl( ) function needs to be modified to include a new arguments. For example:

error=fcntl (fd, F_INSERT, "VINSERTFS");

where F_INSERT is an argument containing attributes associated with the layer to be inserted and VINSERTFS identifies the layer to be inserted into the stack.

Once the kernel is entered, all operations on the file system stack are freezed in step 334. This can be achieved by calling VFS operation: vsf_freeze( ). This is followed by step 336 where a vnode operation, vop_scan_vnode( ) is called. The vnode operation queries the existing top of the stack file system and retrieve all active vnodes (i.e. vnodes cached in the memory) thereof and uses the retrieved vnodes to create new vnodes of the newly inserted file system that becomes top of the stack file system after completing the insert operation. An example pseudo-code for the vop_scan_vnode( ) command according to an embodiment is:

```
Begin
    For all vnodes in the current (top) file system in the stack
        Begin
            Create a new vnode and inode for the new file system to be
            inserted
            Update new inode to save a pointer to the original vnode
            Update directory cache (in memory) by replacing <file
            name, orignal vnode> tuple with <file name, new vnode>
        End
End
```

In the above example, the directory cache is an in-memory cache that stores the tuple <file name, vnode>. It gives vnode for a specified file name during a lookup operation. The lookup operation is performed when the file system is opened via the open( ) system call. It should be noted that the lookup operation is also triggered during a directory cache searching activity.

In an embodiment, the inserting layer, VINSERTFS, can be inserted into the stack using existing mount operation:

mount—o VINSERTFS, [INSERTLAYER=N]/inserts_mount_point where N indicates the layer number. The default value of N is zero which implies the insertion is at the top of the stack. Once the information of the inserting layer is updated, file system operations can be resumed by calling vfs_thaw( ) in step 338.

The foregoing description of the present invention is provided with respect to specific embodiments and examples thereof. It will be appreciated that those skilled in the art, upon attaining an understanding of the foregoing, may readily adapt the same for alterations to, variations of, and equivalents to such embodiments. For instance, the layer ejection and insertion functions described in the foregoing are provided in the context of a HP-UX operating system. The algorithms are readily adaptable by using equivalent commands employed by alternative operating systems to achieve substantially the same functionalities. Accordingly, the scope of the present disclosure is not to be limited to the details given herein, but may be modified within the scope and equivalents of the appended claims.

The invention claimed is:

1. A stacked file system comprising:
a stack, stored in a memory, having at least a file system stacked on top of an underlying file system; and
a stack manager, hosted by an operating system included in the memory, having a logic for managing the stack, wherein the logic comprises an eject operation for ejecting a first file system from the stack, and wherein the eject operation comprises executing an algorithm comprising:
obtaining a first mount point of the first file system; and
ejecting the first file system at the identified first mount point by passing information handled by the first file system being ejected to the underlying file system, wherein ejecting the first file system at the identified first mount point by passing information comprises passing vnodes handled by the first file system being ejected to the underlying file system, and wherein the eject operation is completed upon removal of the vnodes handled by the first file system from a virtual file system (VFS) mounted list.

2. The system of claim 1, wherein the logic comprises an insert operation for inserting a second file system into the stack.

3. The system of claim 2, wherein insert operation comprises executing an algorithm comprising:
determining a second mount point for the second file system; and
inserting the second file system at the identified second mount point by retrieving information handled by a file system below the second file system and updating the retrieved information with information associating with the inserting file system for handling thereby.

4. A method for managing a stack, the stack being stored in a memory and having at least a file system stacked on top of an underlying file system, the method comprising:
ejecting a first file system from the stack, wherein ejecting the first file system comprises:
obtaining a first mounting point of the first file system; and
ejecting the first file system at the identified first mounting point, comprising transferring information associated with the first file system to the underlying file system, wherein transferring information associated with the first file system comprises transferring vnodes associated with the first file system to the underlying file system, and wherein ejecting the first file system from the stack is completed upon removal of the vnodes handled by the first file system from a virtual file system (VFS) mounted list.

5. The method of claim 4 further comprising inserting a second file system into the stack.

6. The method of claim 5, wherein inserting the second file system into the stack comprises:
determining a second mounting point for the second file system; and
inserting the second file system at the identified second mounting point.

7. The method of claim 6, wherein inserting the second file system comprises:
freezing operations of the stack;
retrieving information on the stack;
updating the retrieved information with information of the second file system; and
unfreezing the operations of the stack.

8. The method of claim 7, wherein retrieving information on the stack comprises retrieving vnodes of the stack.

9. The method of claim 8, wherein updating the retrieved information comprises creating new vnodes incorporating information from the second file system.

10. The method of claim 9 further comprising updating directory cache with tuple of the second file system.

11. A non-transitory computer readable storage medium having a software program stored thereon, the software program comprising instructions, when executed by a computing environment, performs a method for managing a stack, the stack being stored in a memory and having at least a file system stacked on top of an underlying file system, the method comprising:
electing a first file system from the stack, wherein electing the first file system comprises:
obtaining a first mounting point of the first file system; and
ejecting the first file system at the identified first mounting point, comprising transferring information associated with the first file system to the underlying file system, wherein transferring information associated with the first file system comprises transferring vnodes associated with the first file system to the underlying file system, and wherein ejecting the first file system from the stack is completed upon removal of the vnodes handled by the first file system from a virtual file system (VFS) mounted list.

* * * * *